(12) United States Patent
Afrouzi et al.

(10) Patent No.: US 10,800,208 B2
(45) Date of Patent: Oct. 13, 2020

(54) FRONT SUSPENSION WHEEL FOR MOBILE ROBOTIC DEVICES

(71) Applicants: Ali Ebrahimi Afrouzi, San Jose, CA (US); Masoud Nasiri Sarvi, Toronto (CA); Scott McDonald, Toronto (CA)

(72) Inventors: Ali Ebrahimi Afrouzi, San Jose, CA (US); Masoud Nasiri Sarvi, Toronto (CA); Scott McDonald, Toronto (CA)

( * ) Notice: Subject to any disclaimer, the term of this patent is extended or adjusted under 35 U.S.C. 154(b) by 222 days.

(21) Appl. No.: 15/923,463

(22) Filed: Mar. 16, 2018

(65) Prior Publication Data
US 2019/0283501 A1    Sep. 19, 2019

(51) Int. Cl.
| | | |
|---|---|---|
| *B60B 33/06* | (2006.01) | |
| *B62D 63/04* | (2006.01) | |
| *B62D 55/084* | (2006.01) | |
| *B62D 65/00* | (2006.01) | |
| *G05D 1/02* | (2020.01) | |
| *B60G 17/019* | (2006.01) | |
| *B60G 17/02* | (2006.01) | |
| *B60B 33/04* | (2006.01) | |
| *B60G 17/015* | (2006.01) | |

(52) U.S. Cl.
CPC .......... *B60B 33/06* (2013.01); *B60B 33/045* (2013.01); *B60G 17/0157* (2013.01); *B60G 17/01908* (2013.01); *B60G 17/021* (2013.01); *B62D 55/084* (2013.01); *B62D 63/04* (2013.01); *B62D 65/00* (2013.01); *G05D 1/021* (2013.01); *B60B 2200/49* (2013.01); *B60B 2320/10* (2013.01); *B60B 2900/551* (2013.01); *B60G 2300/00* (2013.01); *B60G 2400/204* (2013.01); *B60G 2500/322* (2013.01); *B60G 2600/182* (2013.01); *G05D 2201/0215* (2013.01)

(58) Field of Classification Search
None
See application file for complete search history.

(56) References Cited

U.S. PATENT DOCUMENTS

| | | | | |
|---|---|---|---|---|
| 4,756,496 | A * | 7/1988 | Hosan .................. | A47C 3/30 108/147 |
| 5,303,449 | A * | 4/1994 | Gray .................. | B60B 33/0028 16/18 CG |
| 5,372,211 | A | 12/1994 | Wilcox et al. | |
| 7,173,391 | B2 | 2/2007 | Jones et al. | |
| 7,441,298 | B2 * | 10/2008 | Svendsen .................. | A47L 5/30 15/49.1 |
| 7,620,476 | B2 * | 11/2009 | Morse .................. | A47L 5/14 15/319 |
| 7,761,954 | B2 | 7/2010 | Ziegler et al. | |
| 8,961,695 | B2 | 2/2015 | Romanov et al. | |
| 9,883,778 | B2 * | 2/2018 | Vanderstegen-Drake .................. | A47L 9/009 |
| 2018/0213987 | A1* | 8/2018 | Hong .................. | A47L 9/02 |
| 2019/0133400 | A1* | 5/2019 | Klintemyr .................. | A47L 9/0494 |

* cited by examiner

*Primary Examiner* — Joseph M Rocca
*Assistant Examiner* — Harold Eric Pahlock, III

(57) ABSTRACT

A front suspension wheel for mobile robotic devices that can be compressed into or decompressed out of a main body of a mobile robotic device to facilitate driving the mobile robotic device over obstacles, thresholds and the like. The wheel will provide the mobile robotic device with information such as how fast the wheel is traveling. The wheel is easily removable by hand by the user.

20 Claims, 5 Drawing Sheets

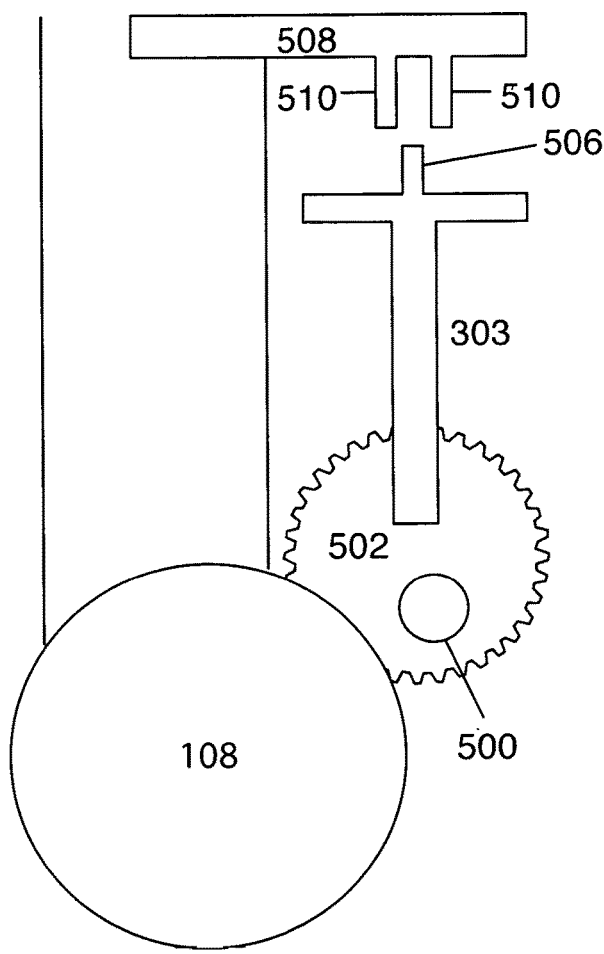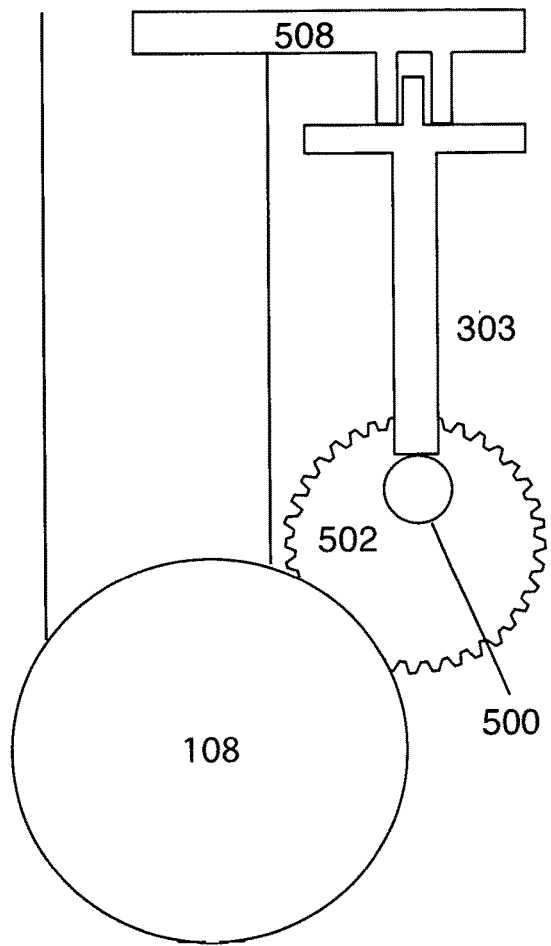
FIG.5A
FIG.5B

FRONT SUSPENSION WHEEL FOR MOBILE ROBOTIC DEVICES

CROSS-REFERENCE TO RELATED APPLICATIONS

This application claims the benefit of provisional patent application No. 62/473,247, filed Mar. 17, 2017 by the present inventors.

FIELD OF THE INVENTION

The present invention relates to mobile robotic devices and more particularly to the front wheel of a mobile robotic device.

BACKGROUND

Mobile robotic devices are common in the home and workplace. These include everything from industrial robots in the workplace to robotic cleaning devices at home. One issue that has remained however is the front leading wheel of robotic devices getting stuck on flooring transitions and small obstacles. For example, some robotic vacuums may be unable to drive over a threshold and thus may be prevented from servicing part of a work area. One solution has included attempts to identify obstacles in advance and drive around them. However this is wasteful of time and energy as the robot must spend time driving around said obstacle. A need exists for a front wheel for a robotic device that is more easily able to assist robotic devices in overcoming obstacles, thresholds and the like.

SUMMARY

It is a goal of the present invention to provide a front wheel for a robotic device that is able to drive over obstacles of larger size, thresholds and the like without becoming stuck.

It is a goal of the present invention to provide a front wheel for a robotic device that can self-diagnose wheel issues by collecting data through its wheels.

It is a goal of the present invention to provide a robotic device that can collect data on the speed the front wheel is traveling at.

The aforementioned objectives are achieved through a front suspension wheel for a robotic device that can move in and out of the main body of a robotic device. Sensors also gather data about the wheel to help a central processing unit determine whether the robotic device is stuck and if a remedying action should be taken.

BRIEF DESCRIPTION OF THE DRAWINGS

FIG. 5A illustrates a side elevation view of an encoder embodying features of the present invention.

FIG. 5B illustrates a side elevation view of an encoder embodying features of the present invention.

DETAILED DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The terms "an embodiment", "embodiment", "embodiments", "the embodiment", "the embodiments", "one or more embodiments", "some embodiments", "preferred embodiment", "certain embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

The present invention proposes a front wheel for a mobile robotic device.

Figure 1A:
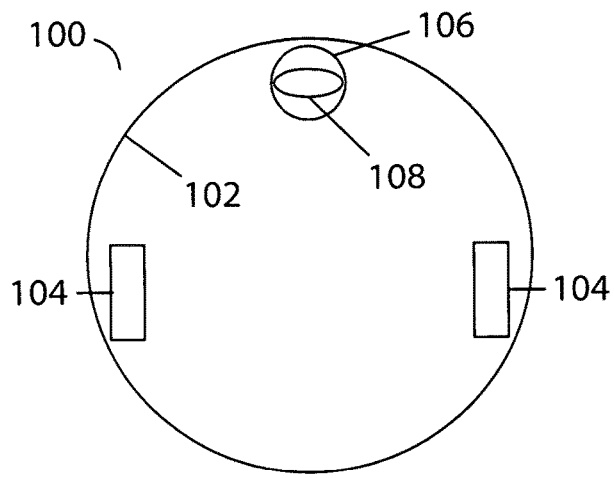
FIG. 1A illustrates a bottom plan view of a robotic device embodying features of the present invention.

Referring to FIG. 1A, a bottom plan view of a robotic device 100 is illustrated. Robotic device 100 is comprised of main body 102, side wheels 104, and front wheel 108, which is connected to the main body via compressible column 106. A spring (not shown) within compressible column 106 allows the column to move up and down with respect to the main body of the mobile robotic device. This feature may aid the robotic device in driving over obstacles, thresholds and the like.

Figure 1B:
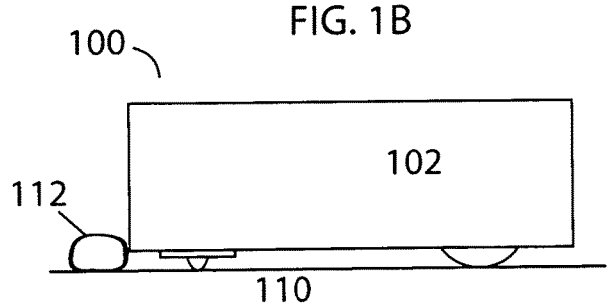
FIG. 1B illustrates a side elevation view of a robotic device embodying features of the present invention.
Figure 1C:
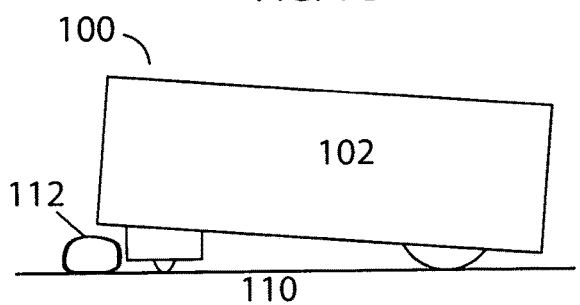
FIG. 1C illustrates a side elevation view of a robotic device embodying features of the present invention.

Referring to FIG. 1B, a side elevation view of robotic device 100 encountering an obstacle 112 on surface 110 is illustrated. In the default position, the column 106 is fully compressed, as shown here. However, when the robotic device encounters an obstacle such as obstacle 112, the column 106 may decompress, increasing the distance between the surface 110 and the main body 102 of the robotic device, as shown in FIG. 1C. This allows the main body 102 of the robotic device to pass over obstacle 112.

Figure 1D:
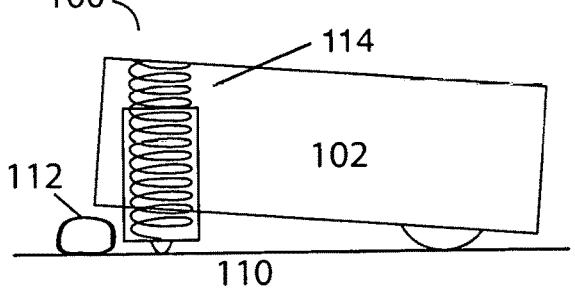
FIG. 1D illustrates a side elevation view of a robotic device embodying features of the present invention.
Figure 1E:
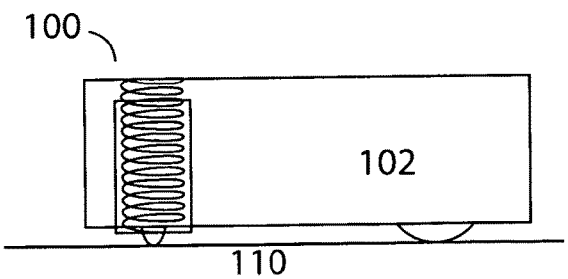
FIG. 1E illustrates a side elevation view of a robotic device embodying features of the present invention.

Referring to FIGS. 1D and 1E, the internal spring that assists this process is illustrated. In FIG. 1D, the spring 114 and column 106 are extended. In FIG. 1E, the default position, with the spring 114 and column 106 in their most compressed states, is illustrated.

In the preferred embodiment, the wheel subassembly will be stored inside of the device during normal working operation. Such a normal working operation would be on a uniform floor surface or when no obstacles are present. For example, when the device comes to an edge of some type such as a transition from one surface type to another, for instance, a wood to a carpeted floor, or when the device encounters and obstacle, then the subassembly will extend out from the bottom of the robotic device in order to overcome the obstacle, threshold or the like.

Figure 2:
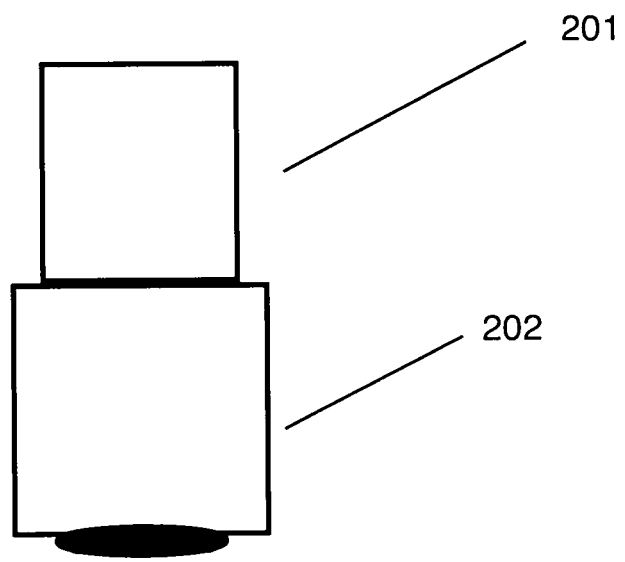
FIG. 2 illustrates the two sections of the subassembly containing the wheel.

FIG. 2 demonstrates how the wheel will comprise of two subassembly sections. The first section 201 is attached to the main body of the robotic device. The second section 202 will contain the wheel. These two portions are connected by an internal member 302 (not shown). Enough space is allowed between the two pieces for rotational movement. An internal lip works as a floor to keep the second section from falling off the device.

Figure 3A:
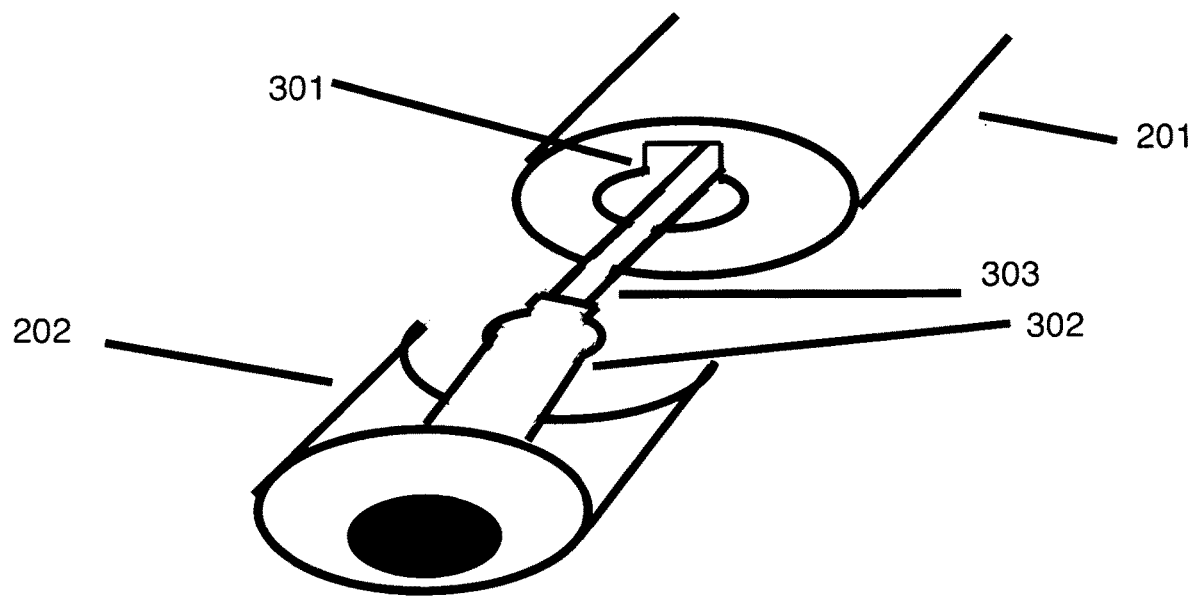
FIG. 3A illustrates the first step of the process of removing the two separate subassemblies.
Figure 3B:
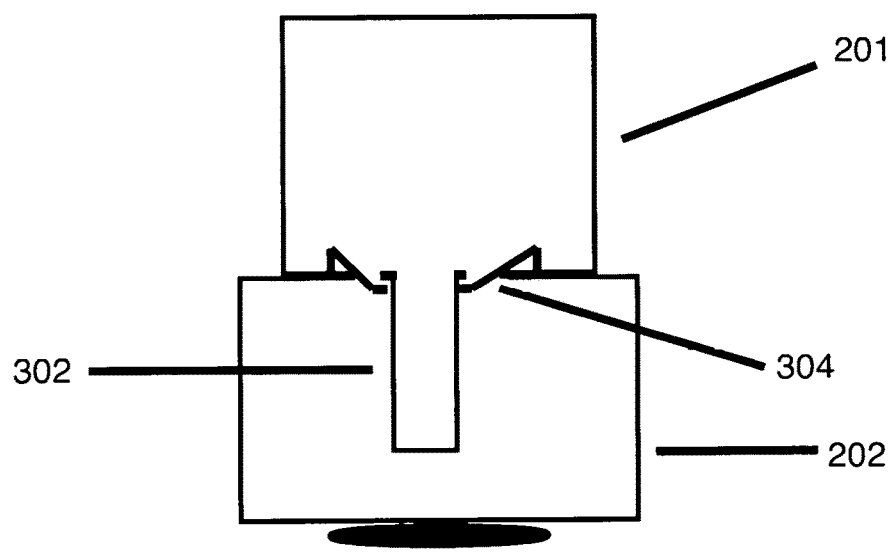
FIG. 3B illustrates the second step in the process of removing the separate subassemblies.

In the preferred embodiment, the lower second subassembly section containing the wheel will have the ability to be removed easily by a user by hand. The user will have the ability to rotate the second lower section of the subassembly. In FIG. 3A the user must first rotate this second lower subassembly section 202 a specified number of degrees. A lip will act as a barrier preventing the first and second subassemblies from being able to be pulled apart until the user has rotated the subassembly to a predetermined degree where a gap 301 is located. The lower subassembly section will contain an internal member piece 302 with a tooth that will prevent the lower subassembly section from being removed from the upper subassembly section until rotated to the gap 301. Once the user has rotated the second subassembly section to this gap the user must then pull down with force in order to remove the second subassembly. In FIG. 3B the use of force is necessary as metal clips 304 are utilized in securing the second portion of the subassembly to the upper first section of the subassembly as a second form of securing the two pieces together. The metal clips ensure that the two subassembly sections do not come apart from each other without use of force. In FIG. 3A internal rod 303 is displayed. This rod is utilized for stimulating an encoder 508 (not shown).

Figure 4A:
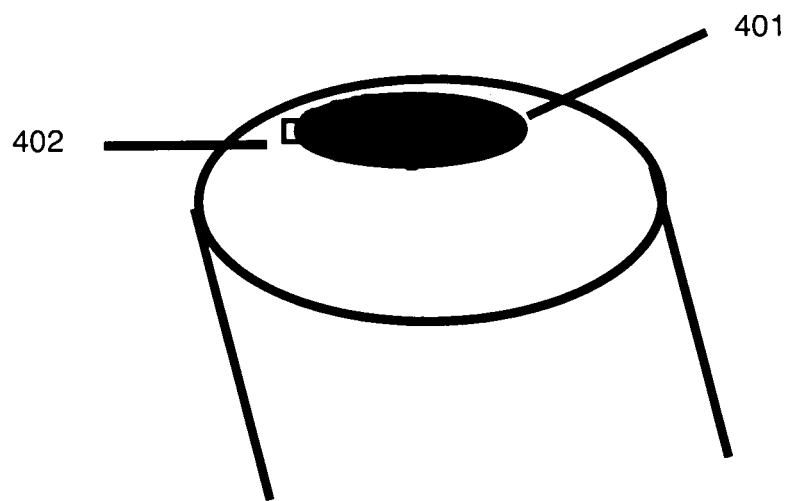
FIG. 4A illustrates the wheel as it is stored in the subassembly.
Figure 4B:
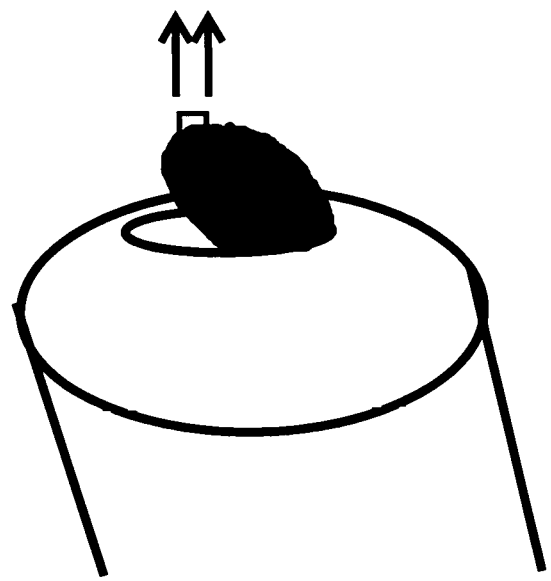
FIG. 4B illustrates the wheel being removed from the subassembly.

In the preferred embodiment, the wheel itself will be removable by hand from the second subassembly section. The axle of the wheel is pressed firmly into the wheel subassembly casing. A small extrusion is added to one side of the axle to allow the user to pivot the axle and wheel up for removal by hand. In FIG. 4a the wheel 401 is housed within the lower subassembly. An extrusion from the wheel axle 402 is shown. In FIG. 4b, the user has pulled up extrusion 402 in order to lift wheel 401 out of the wheel socket.

In some embodiments, the front wheel for the robotic device also includes an electronic switch mounted to the upper subassembly that is tripped when the column is fully compressed. This data is sent to a processor of the robotic device and may be used to determine various actions that should be taken.

In some embodiments, the robotic device also includes an encoder that measures the speed at which the front wheel is turning. Referring to FIGS. 5A and 5B, the encoder apparatus is illustrated. An off-center axis 500 is connected to friction gears 502 that interact with the wheel 108. The off-center axis 500 periodically pushes a rod 303 up and down. The top 506 of the rod interacts with the encoder 508, blocking and unblocking a line of sight between two halves 510 of the sensor. The rate of the blocking and unblocking corresponds with the speed of the wheel. In FIG. 5A, the off-center axis 500 is not pushing the rod, so it is not blocking the line of sight between the two halves of the sensor. In FIG. 5B, the off-center axis 500 is pushing the rod, so it is blocking the line of sight between the two halves of the sensor. This system only works when the column is fully compressed, since the off-center axis and rod do not interact otherwise.

In the preferred embodiment the wheel will have the ability to rotate in 360 degrees.

In all embodiments, the wheel can be a caster, wheel, a track or any conceivable wheel form.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

We claim:

1. A front wheel assembly of a mobile robotic device comprising:
    a compressible column comprising:
        a spring;
        an upper portion subassembly comprising:
            an encoder;
            a rod to stimulate the encoder; and
            a locking mechanism for securing a lower portion subassembly; and
        the lower portion subassembly comprising:
            a mechanism for locking to the upper subassembly;
            a mechanism for providing movement to the rod; and
            a wheel;
    wherein the lower subassembly is unlocked by rotating the lower subassembly a predesignated number of degrees and a downward pulling force applied to the lower subassembly disengages clips holding the lower subassembly to the upper subassembly, thereby completely removing the lower subassembly from the upper subassembly.

2. The front wheel assembly of claim 1, wherein the encoder collects information indicative of the speed of rotation of the wheel.

3. The front wheel assembly of claim 1, wherein the wheel includes an axle including an extrusion for removing the wheel by hand.

4. The front wheel assembly of claim 1, wherein decompression of the compressible column raises the column and the mobile robotic device attached thereto.

5. The front wheel assembly of claim 4, wherein the compressible column decompresses upon the mobile robotic device approaching an obstacle.

6. The front wheel assembly of claim 5, wherein the mobile robotic device is more easily able to drive over the obstacle when the column decompresses.

7. The front wheel assembly of claim 4, wherein the column decompresses upon the mobile robotic device approaching a driving surface transition.

8. The front wheel assembly of claim 7, wherein the mobile robotic device is more easily able to overcome the driving surface transition when the column decompresses.

9. The front wheel assembly of claim 1, wherein the wheel comprises a caster or a track.

10. The front wheel assembly of claim 1, wherein the mobile robotic device comprises a processor effectuating operations comprising:
  determining an action of the mobile robotic device based on data from an electronic switch mounted to the upper subassembly, wherein the electronic switch trips when the column is fully compressed.

11. The front wheel assembly of claim 1, wherein the mobile robotic device comprises a processor effectuating operations comprising:
  determining a self-diagnosis for the wheel based on sensor data.

12. The front wheel assembly of claim 1, wherein the mobile robotic device comprises a processor effectuating operations comprising:
  determining a stuck state of the mobile robotic device based on sensor data, and if stuck, a remedying action of the mobile robotic device.

13. A method for mobile robotic devices to overcome obstacles and driving surface transitions comprising:
  providing a mobile robotic device comprising:
    a main body;
    a processor;
    a compressible column attached to the main body comprising a spring, an upper subassembly, and a lower subassembly;
    a set of wheels; and
    a control unit to provide at least one movement pattern to the mobile robotic device;
  decompressing the compressible column when the mobile robotic device approaches an obstacle or a driving surface transition, thereby raising the mobile robotic device; and
  driving the mobile robotic device over the obstacle or driving surface transition;
wherein the lower subassembly is unlocked by rotating the lower subassembly a predesignated number of degrees and a downward pulling force applied to the lower subassembly disengages clips holding the lower subassembly to the upper subassembly, thereby completely removing the lower subassembly from the upper subassembly.

14. The method of claim 13, wherein:
  the upper portion subassembly comprises:
    an encoder;
    a rod to stimulate the encoder; and
    a locking mechanism for securing a lower portion subassembly; and
  the lower portion subassembly comprises:
    a mechanism for locking to the upper subassembly;
    a mechanism for providing movement to the rod; and
    a wheel.

15. The method of claim 14, wherein the encoder collects information indicative of the speed of rotation of the wheel.

16. The method of claim 14, wherein the wheel includes an axle including an extrusion for removing the wheel by hand.

17. The method of claim 14, wherein the wheel comprises a caster or a track.

18. The method of claim 13, wherein the processor effectuates operations comprising:
  determining an action of the mobile robotic device based on data from an electronic switch mounted to the upper subassembly, wherein the electronic switch trips when the column is fully compressed.

19. The method of claim 13, wherein the processor effectuates operations comprising:
  determining a self-diagnosis for the wheel based on sensor data.

20. The method of claim 13, wherein the processor effectuates operations comprising:
  determining a stuck state of the mobile robotic device based on sensor data, and if stuck, a remedying action of the mobile robotic device.

* * * * *